US 9,985,470 B2

(12) United States Patent
Paatero

(10) Patent No.: US 9,985,470 B2
(45) Date of Patent: May 29, 2018

(54) UNINTERRUPTABLE POWER SUPPLY SYSTEM WITH FAULT CLEAR CAPABILITY

(71) Applicant: ABB Technology AG, Zurich (CH)

(72) Inventor: Esa-Kai Paatero, Minusio (CH)

(73) Assignee: ABB Schweiz AG, Baden (CH)

( * ) Notice: Subject to any disclaimer, the term of this patent is extended or adjusted under 35 U.S.C. 154(b) by 200 days.

(21) Appl. No.: 15/157,226

(22) Filed: May 17, 2016

(65) Prior Publication Data
US 2016/0344232 A1 Nov. 24, 2016

(30) Foreign Application Priority Data

May 18, 2015 (EP) .................................... 15167954

(51) Int. Cl.
H02J 9/06 (2006.01)
H02M 3/04 (2006.01)
H02M 7/04 (2006.01)
H02M 7/44 (2006.01)

(52) U.S. Cl.
CPC ................. *H02J 9/06* (2013.01); *H02M 3/04* (2013.01); *H02M 7/04* (2013.01); *H02M 7/44* (2013.01)

(58) Field of Classification Search
CPC .. H02J 9/06; H02M 3/04; H02M 7/04; H02M 7/44
See application file for complete search history.

(56) References Cited

U.S. PATENT DOCUMENTS

2007/0182383 A1* 8/2007 Park ........................ H02J 3/386
322/89
2008/0265680 A1 10/2008 Marwali et al.
2010/0026098 A1* 2/2010 Marbach ................. H02J 9/062
307/66
(Continued)

FOREIGN PATENT DOCUMENTS

WO 2014053464 A1 4/2014

OTHER PUBLICATIONS

European Patent Office, Extended Search Report issued in corresponding Application No. 15167954.6, dated Nov. 24, 2015, 6 pp.
(Continued)

Primary Examiner — Jared Fureman
Assistant Examiner — Esayas Yeshaw
(74) Attorney, Agent, or Firm — Taft Stettinius & Hollister LLP; J. Bruce Schelkopf

(57) ABSTRACT

The present invention provides an uninterruptable power supply system and method with a first AC source providing three-phase AC power, a DC source providing DC power, and a power converter receiving AC power from the first AC source and/or DC power from the DC source and delivering two wire DC power to a load via a DC output line. One pole of the DC output line is connected to the neutral reference of the four-wire AC-power supply line. The system may include a bypass device for passing power from its output side to the DC output line with the bypass device and the power converter being connected in parallel to the DC output line. The bypass device may include at least one switching unit, which receives AC power at its input side, and a control unit to supply pulsed power from an AC power supply.

20 Claims, 15 Drawing Sheets

(56) References Cited

U.S. PATENT DOCUMENTS

| | | | |
|---|---|---|---|
| 2010/0292853 A1* | 11/2010 | McDonnell | H02J 3/34 700/287 |
| 2012/0119581 A1 | 5/2012 | Silberbauer et al. | |
| 2012/0217749 A1* | 8/2012 | Castelli Dezza | H02P 9/305 290/44 |
| 2014/0097690 A1 | 4/2014 | Costa et al. | |
| 2014/0266074 A1* | 9/2014 | Herber | H02J 7/007 320/166 |
| 2015/0061392 A1* | 3/2015 | Berard | G01R 31/42 307/52 |
| 2015/0270744 A1* | 9/2015 | Lacarnoy | H02J 9/061 307/66 |

OTHER PUBLICATIONS

Sithimolada et al., "Facility-level DC vs. Typical AC Distribution for Data Centers," IEEE (2010), pp. 2102-2107.

\* cited by examiner

UNINTERRUPTABLE POWER SUPPLY SYSTEM WITH FAULT CLEAR CAPABILITY

TECHNICAL FIELD

The present invention relates to the technical field of uninterruptable power supply system. More particularly, the invention relates to the field of converters for providing DC power to a DC load. Still more particularly, the invention refers to the area of fault clearance for UPS systems providing DC power to a DC load.

BACKGROUND ART

It is known in the art to provide uninterruptable power supply (UPS) systems, which comprise at least one converter or multiple parallel converters. The converters are responsible for converting source power into output power as required for a load. Hence, the converters are typically connected to a primary power source for normal operation and a secondary power source, which powers the load in case of a failure of the primary power source. Primary and secondary source can be any kind of source, which can be provided individually for each converter, or which can be provided commonly for groups of converters or even all converters. Typically, the primary power source is an AC source, and the secondary power source is a DC source.

The typical design of a converter comprises a DC link, which is connected to a first and second input converter unit connected to the primary and secondary power source, respectively, and an output converter unit, which provides the output power as required for the load.

The design of the UPS system comprises AC/DC and DC/AC converters for historical reasons due to the simplicity and prevalence of AC power transmission. Nevertheless, the output converter unit can be a DC/AC-converter or a DC/DC-converter, depending on the type of load. An AC/DC-DC/AC conversion scheme with an AC load is industry standard but suffers from a penalty of not optimal system efficiency as typical loads comprise AC/DC-DC/DC converters. Accordingly, the DC/AC conversion at the load side of the converter prior to the AC/DC conversion at an input side of the load is not necessary and merely adds losses to the overall system efficiency.

For this reason, a new operating environment based on AC/DC-DC/DC UPS is emerging, thereby eliminating the above conversion steps from DC to AC at the converter and from AC to DC at the load, which are unnecessary conversion steps, so that the losses in the overall system are reduced. There is no standard yet established. However, practical alternatives are a two wire DC output of the UPS system at about 380V with either end connected to system reference, either a AC neutral or ground, or a split DC of the same voltage with midpoint connected to a reference. A drawback is loss of fault clear capability as a bypass with very high current source capability with a DC source is unpractical.

Fault clear capability refers to clearance of operating conditions of the load. The load side of the converter is current limited due to availability of practical semiconductor devices allowing a maximum current. Hence, abnormal operating conditions of the load, e.g. a short circuit, can make the UPS system to operate at maximum power without activation of protection means at the load side, e.g. without melting fuses which protect the load. Protection means of the UPS system can be activated prior to activating protection means at the load side, thereby leaving the load in a potentially dangerous state for the load and for operating personal.

In state of the art UPS systems, which provide AC power to the load, abnormal operating conditions, e.g. a short circuit, rely on a separate power path bypassing the converter units to connect the AC source directly to the load side to clear the fault through a current, which is limited only by source impedance.

DISCLOSURE OF INVENTION

It is an object of the present invention to provide an uninterruptable power supply system delivering two wire DC power to a load via a DC output and a method for realizing a bypass in such an uninterruptable power supply system, which enable increased system and operator safety. In particular, it is an object of the present invention to provide an uninterruptable power supply system delivering two wire DC power to a load via a DC output and a method for realizing a bypass in such an uninterruptable power supply system, which provide fault clear capability.

This object is achieved by the independent claims. Advantageous embodiments are given in the dependent claims.

In particular, the present invention provides an uninterruptable power supply system comprising a first AC source providing three-phase AC power via a four-wire AC-power supply line, a DC source providing DC power via a DC power supply line, and a power converter receiving AC power from the first AC source and/or DC power from the DC source and delivering two wire DC power to a load via a DC output line, whereby one pole of the DC output line is connected to the neutral reference of the four-wire AC-power supply line, whereby the uninterruptable power supply system further comprises a bypass device for passing power from its output side to the DC output line, whereby the bypass device and the power converter are connected in parallel to the DC output line, and the bypass device comprises at least one switching unit, which receives AC power at its input side, and a control unit, whereby the switching unit is controlled by the control unit to supply pulsed power from an AC power supply with essentially the same polarity as the DC output line.

The present invention also provides a method for realizing a bypass in an uninterruptable power supply system comprising a first AC source providing three-phase AC power via a four-wire AC-power supply line a DC source providing DC power via a DC power supply line, and a power converter receiving AC power from the first AC source and/or DC power from the DC source and delivering DC power to a load via a DC output line, whereby one pole of the DC output line is connected to the neutral reference of the four-wire AC-power supply line, comprising the steps of providing a bypass device, connecting the bypass device and the power converter in parallel to the DC output line, whereby the bypass device comprises at least one switching unit, detecting a load failure, controlling the switching unit to supply pulsed power from an AC power supply received from its input side with essentially the same polarity as the DC output line for passing power from its output side to the DC output line.

The basic idea of the invention is to provide power pulses from the AC source to the load directly without passing the converter. Accordingly, current limitations given for the converter can be overridden and fault clear capability is fully enabled. The pulsed power refers to power from power pulses having a desired polarity, e.g. a positive or negative voltage, as provided from the AC source. The switching unit enables current supply to the load, which is in case of a short circuit at the load merely limited by the source impedance, so that protection mechanisms of the load can operate in a desired manner. This way, increased system and operator safety is secured. The use of unneeded converter units for providing a AC/DC conversion at the output of the converter and for providing a DC/AC conversion at the load can be omitted without limiting performance and/or safety of the entire system including the load and the UPS system. Increased reliability of the system with separation of e.g. a faulty branch at the load side through standard and low cost protective devices, which are known in the art, can be reliable obtained. Special protective devices for the load, which are e.g. adapted to the use with UPS systems and which are adapted to limited fault currents, are not required.

Based on the activation time of the bypass device, very fast reaction times can be achieved and fault clear capability limited by AC source impedance can be provided almost immediately.

Controlling the switching unit to supply pulsed power from an AC power supply received from its input side to the load refers e.g. to switching the switching device on or conductive, so that a bypass from the AC source to the load is provided, and switching off refers to switching the switching device not conductive, so that the bypass from the AC source to the load is interrupted.

The two wire DC power typically comprises a reference and a positive or negative voltage, which is provided from the power converter. Nevertheless, the converter is not limited to providing only positive or negative power. Nevertheless, each load receives two-wire DC power with positive or negative voltage, in particular with respect to the neutral reference. Hence, the two wire DC power comprises a reference and a positive or negative voltage, which is provided from the power converter, and each load receives two-wire DC power with positive or negative voltage, in particular with respect to the neutral reference. Hence, in general, the load is connected to two poles of the DC output line. Nevertheless, the load can also be connected to the positive and negative voltage of the DC output line.

The control unit can be part of the converter, i.e. the converter and the bypass device have a common control unit. In particular, when the bypass device is provided integral with the converter, it is beneficial to provide only one control unit controlling the bypass device and the converter units of the converter function. Nevertheless, the converter and the bypass device can have individual control units.

According to a modified embodiment of the invention the DC output line comprises three poles including a positive pole, a negative pole, and a an electric middle pole, whereby the electric middle pole is connected to the neutral reference of the four-wire AC-power supply line. Hence, the two wire DC power is provided to the positive and the negative pole with the additional neutral reference.

According to a modified embodiment of the invention the bypass device comprises at least two switching units, which are connected to the positive and negative pole, for supplying pulsed power with essentially the same polarity as the DC output line to the load at the positive and negative pole with reference to the electric middle pole. Hence, a bypass can be provided for loads connected to the positive or negative pole of the DC output line in the same way.

According to a modified embodiment of the invention the bypass device comprises at least two switching units for supplying pulsed power with essentially the same polarity as the DC output line to the load, whereby the switching units are at their input side connected to different phases of the first AC source which are connected at their output side to the same pole of the DC output line. Hence, at least two phases of the AC source can be provided connectable to the load for fault clear capability. Hence, a more continuous current can be provided to the load. The power can be controlled independently by the control unit using the at least two switching units. Further preferred, the bypass device comprises three switching units, i.e. one switching unit per phase of the AC source.

According to a modified embodiment of the invention the switching units comprise a silicon controlled half wave rectifier circuit or at least one IGBT. The silicon controlled half wave rectifier enables a simple means for providing a bypass for the converter units of the converter, which provides current to enable fault clear operation. Typical semiconductor components for use in the silicon controlled half wave rectifier are power transistors. The IGBT is capable of uni-directional conduction only, which provides a very simple means for implementing a switching unit for current conduction in only one direction. Typically, the IGBT connected in series with a diode.

According to a modified embodiment of the invention the uninterruptable power supply system further comprises a second AC source, which is connected to the bypass device, and the bypass device is controlled by the control unit to supply pulsed power from the second AC source. The second AC source can power the load via the at least one switching unit independently from the first AC source. Accordingly, fault clear capability can be provided with high reliability.

According to a modified embodiment of the invention the control unit is adapted to perform a control of the at least one switching unit based on a phase angle of the AC source. Hence, only part of the half wave of a phase having the required polarity, i.e. a positive or a negative voltage, is provided from the bypass device to the load. Hence, phase voltage to load can be limited to a value below steady state load voltage value.

According to a modified embodiment of the invention the uninterruptable power supply system comprises multiple converters, which are connected in parallel between the first AC source and the DC source on the one side and the DC output line on the other side. The implementation of the UPS system with multiple parallel converters has many advantages. Amongst others, some of the advantages of a system design with multiple parallel converters are scalability of the UPS system for varying loads and redundancy of converters in case of failure. Furthermore, depending on the actual load, converters which are not required can be operated in standby or even shut down to reduce energy consumption of the UPS system. For such a configuration of the UPS system with multiple parallel converters, the first AC source and the DC source can be provided independently as sources for the entire UPS system, i.e. as a global sources. In alternative embodiments, multiple first AC sources and DC sources can be provided for powering the converters individually, or for powering groups of converters. The same applies to the bypass device. Since the idea of the invention is to provide a bypass between the AC-power supply line and the DC output line, also the bypass device can be common to the UPS system or distributed between the multiple converters. Hence, one bypass device can be provided commonly for all converters, or each converter or groups of converters can be provided to bypass the AC-power supply line and the DC output line.

According to a modified embodiment of the invention the uninterruptable power supply system comprises a bypass input protection device connected at the power supply side of the bypass device. The bypass input protection device can be any suitable kind of protection device. A simple protection device is a thermal fuse. Since the current through the bypass is merely limited by the impedance of the load, the current through the bypass device may in the case of a fault at the load reach very high values, so that the protection device may avoid harm to the UPS system.

According to a modified embodiment of the invention the uninterruptable power supply system comprises a converter input protection device connected between the first AC source and the converter. Also the converter input protection device can be any suitable kind of protection device. A simple converter input protection device is a thermal fuse. The converter input protection device limits the input current of the converter to avoid damages of the converter.

The input wiring and protection from the source to the bypass device and the converter can be differently implemented. A protection device can be provided independently for the bypass device and the converter in the respective connection to the AC source. In a different embodiment, the bypass device and the converter can have a common protection device. In a still further embodiment, the bypass device and the converter can have a common main protection device and an additional protection device in the connection of the bypass device, i.e. a bypass input protection device.

According to a modified embodiment of the invention the bypass input protection device is provided to activate its protection with less energy than the converter input protection device. Since the bypass device is only activated in case of failure at the load side to enable fault clear capability, energy through the bypass device is typically small.

According to a modified embodiment of the invention the bypass device comprises a discharge switch unit, which is connected between one pole of the DC output line, which is not connected to the neutral reference of the of the four-wire AC-power supply line, and a current sink, and the control unit is adapted to connect the pole to the current sink after the switching unit is switched on. The discharge switch unit enables uni-directional conduction between the pole and the current sink. This enables to clamp overvoltages due to bypass currents when a load side fault is cleared. In particular, the pole can be connected to the current sink almost simultaneously when switching is performed or after the switching event. The current sink can be neutral reference of the of the four-wire AC-power supply line or a system reference.

BRIEF DESCRIPTION OF DRAWINGS

These and other aspects of the invention will be apparent from and elucidated with reference to the embodiments described hereinafter.

In the drawings.

DETAILED DESCRIPTION OF THE INVENTION

Figure 1:
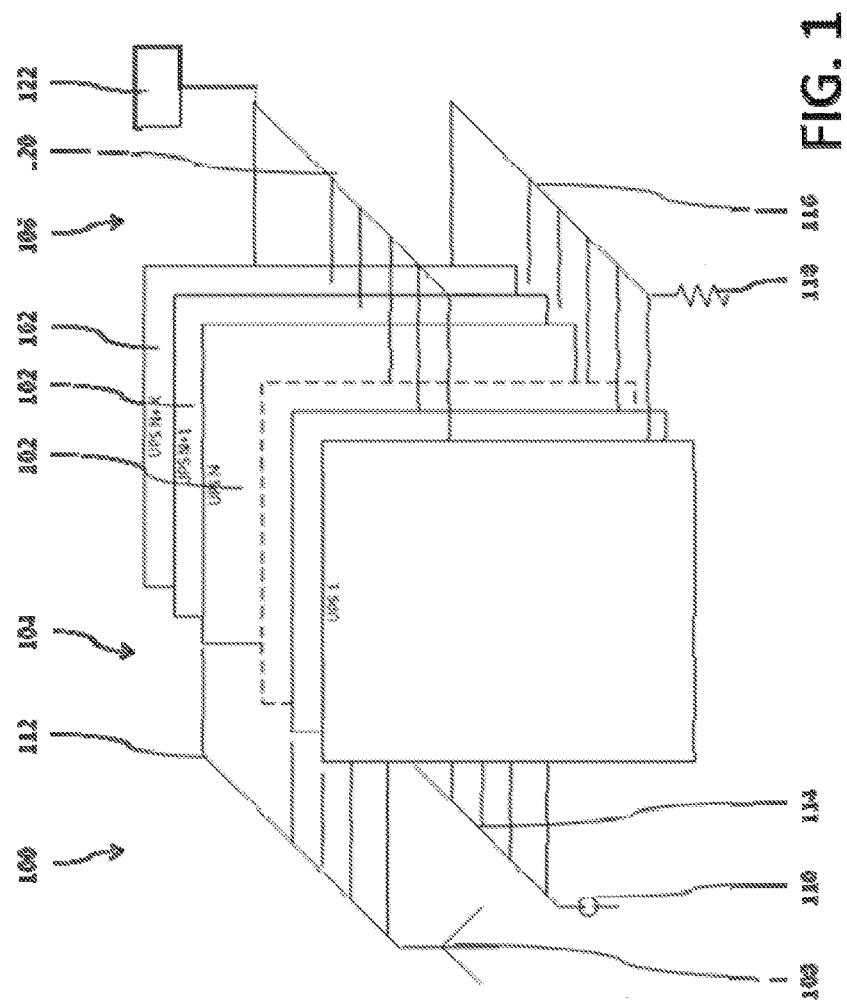
FIG. 1 shows an uninterruptable power supply (UPS) system with multiple converters according to a first embodiment as a schematic drawing.

FIG. 1 shows a typical setup of an uninterruptable power supply (UPS) system 100 according to a first, preferred embodiment. The UPS system 100 comprises multiple parallel converters 102, which are connected in parallel between a power supply side 104 and a load side 106 of the UPS system 100.

On the power supply side 104, the UPS system 100 comprises a first AC source 108 as primary source and a DC source 110 as secondary source, which are connected via an AC power bus 112 and a DC power bus 114, respectively, to the converters 102 in parallel. The first AC source 108 provides three-phase AC power, and the AC power bus 112 is a four-wire AC-power supply line, which is connected to the three phases L1, L2, L3 of the first AC source 108 and neutral of the first AC source 108. The converters 102 can be connected to one or multiple phases L1, L2, L3. Without limitation of this connection, the figures usually show the AC power bus 112 as a single line, which comprises the three phases L1, L2, L3, whereby the converter 102 is connected to one or multiple phases L1, L2, L3. The DC power bus 114 is also referred to as DC power supply line. In an alternative embodiment, multiple first AC sources 108 and/or multiple DC sources 110 are connected to the AC power bus 112 and a DC power bus 114, respectively. one pole of the DC output line 116 is connected to the neutral reference of the four-wire AC-power supply line 112.

On the load side 106, the UPS system 100 is connected via the output power line 116 to a load 118. The load 118 is a two-phase load 118 receiving two wire DC power. The two wire DC power comprises a reference and a positive or negative voltage, which is provided from the power converter. Nevertheless, each load 116 receives two-wire DC power with positive or negative voltage, in particular with respect to the neutral reference. Hence, in general, the load 118 is connected to two poles of the DC output line 116.

Furthermore, the converters 102 are connected via communication bus 120 to a control device 122. Although the communication bus 120 is shown on the load side 106, it is to be noted that the communication bus 120 is independent from the load side 106 or the power supply side 104. Each converter 102 can be individually activated, de-activated or set in any mode of operation by the control device 122 upon respective communication via the communication bus 120.

Figure 2:
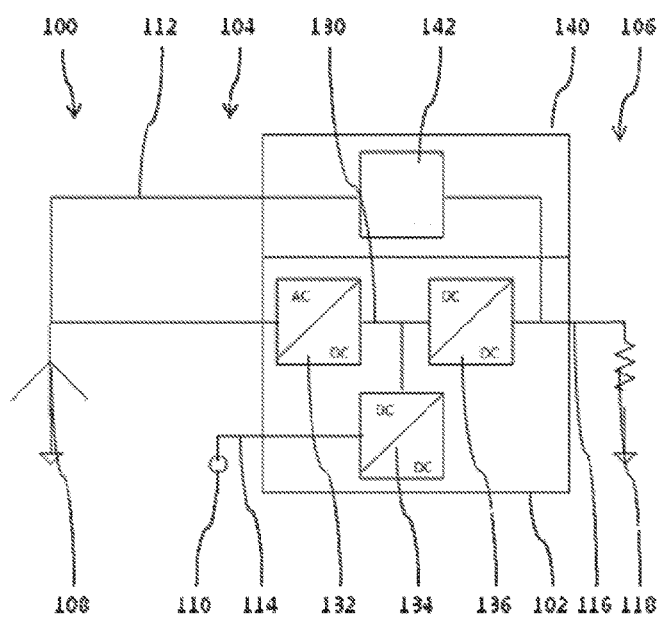
FIG. 2 shows an UPS system in accordance with the UPS system shown in FIG. 1, where only one converter is depicted, with a bypass device according to a second embodiment as a schematic drawing.

Each converter 102 in this embodiment has an identical setup, which can be seen in FIG. 2 with respect to a second embodiment. Nevertheless, in alternative embodiments, the converters 102 may be provided with different properties. The UPS system 100 of the second embodiment can be used as shown in FIG. 2 with a single converter 102. A typical UPS system 100 according to the second embodiment comprises multiple power converters 102, also referred to as converters, which are not shown in FIG. 2. The UPS system 100 of the second embodiment is in-line with the UPS system 100 of the first embodiment. Features not explicitly described with respect to the second embodiment are identical to those of the first embodiment.

As can be seen in FIG. 2, each converter 102 comprises a DC link 130, which is connected at the power supply side 104 to a first and second input converter unit 132, 134. The first and second input converter units 132, 134 are connected via AC power bus 112 and DC power bus 114 to the AC source 108 and the DC source 110, respectively. Hence, the first input converter unit 132 is a AC/DC converter unit, and the second input converter unit 134 is a DC/DC converter unit. On the load side 106, the DC link 130 is connected via output power bus 116 to an output converter unit 136, which provides the DC output power to the load 118.

Each converter further comprises a control unit 138 for controlling the operation of the converter units 132, 134, 136, and which receives commands from the control device 122 via communication bus 120. The control unit 138 can be seen e.g. in FIG. 3 and is connected to the communication bus 120 shown in FIG. 1. The control unit 138 controls the converter units 132, 134, 136 to receive AC power from the first AC source 108 and/or from the DC source 110 and to deliver two wire DC power to the load 118 via the DC output line 116.

Figure 12:
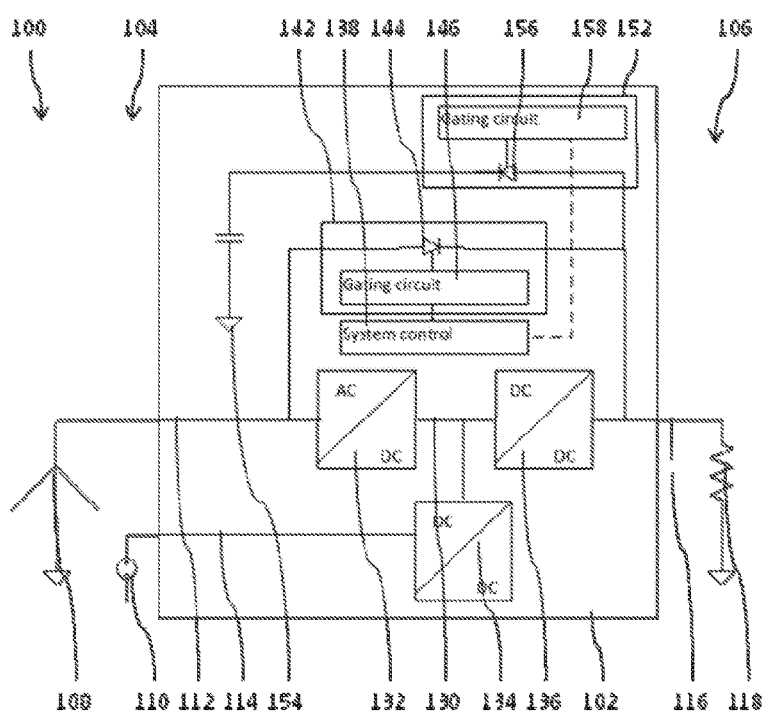
FIG. 12 shows an UPS system in accordance with the UPS system shown in FIG. 3, comprising an additional discharge switch unit according to a seventh embodiment as a schematic drawing.

Still further, the UPS system comprises an additional device 140 comprising a bypass unit 142, which enables a bypass of the converter units 132, 134, 136 and the DC link 130 in case of load failure. Hence, the bypass unit 142 is activated by the control unit 138 in an overload or fault clear situation exceeding the converter 102 current source capability, e.g. to achieve fuse blow at the load side. The bypass unit 142 is connected to the output power bus 116 and the AC source 108. In an alternative embodiment, the bypass unit 142 is connected to a second AC source 150, as indicated in FIG. 12 with respect to the eleventh embodiment.

Figure 3:
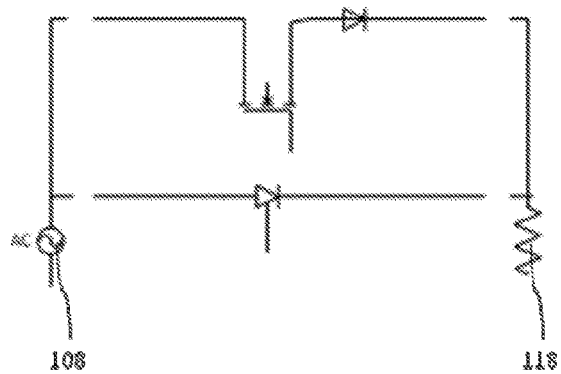
FIG. 3 shows a bypass between the first AC source and the load formed by different switching elements according to a fourth embodiment as a schematic drawing.

The effect of the UPS system 100 having the bypass device 142 is illustrated in FIG. 3. FIG. 3 refers to a bypass formed with the bypass device 142 between the first AC source and the load 118 in accordance with a fourth embodiment. Two parallel implementations of the bypass device 142 are indicated by the parallel connections between the first AC source 108 and the load 118. Hence, in the upper connection, an IGBT and a diode are provided in series. The IGBT is the switching unit 144. In the lower connection, only a thyristor is used as switching unit 144.

Figure 16:
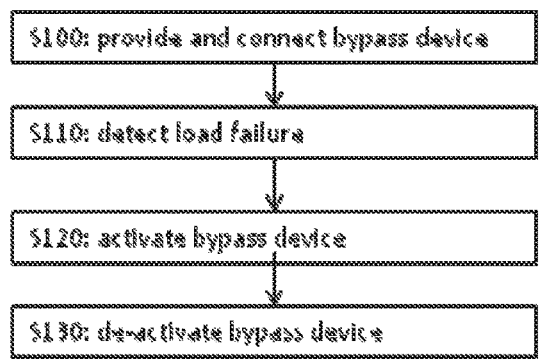
FIG. 16 shows a flow chart of a method for realizing a bypass in an uninterruptable power supply system in accordance with the UPS systems shown in the above figures.

The function of the UPS system 100 of the second embodiment is essentially identical. The function is described with respect to FIGS. 4 and 5. The method for realizing the bypass is shown in FIG. 16.

In step S100, the bypass device 142 is provided and connected between the power supply side 104 and the load side 106.

In step S110, a load failure is detected at time T1. A short circuit occurs at the load 118, so that load voltage drops to almost zero and the current starts to increase. The detection is done either by the control device 122 or the control unit 138.

Figure 4:
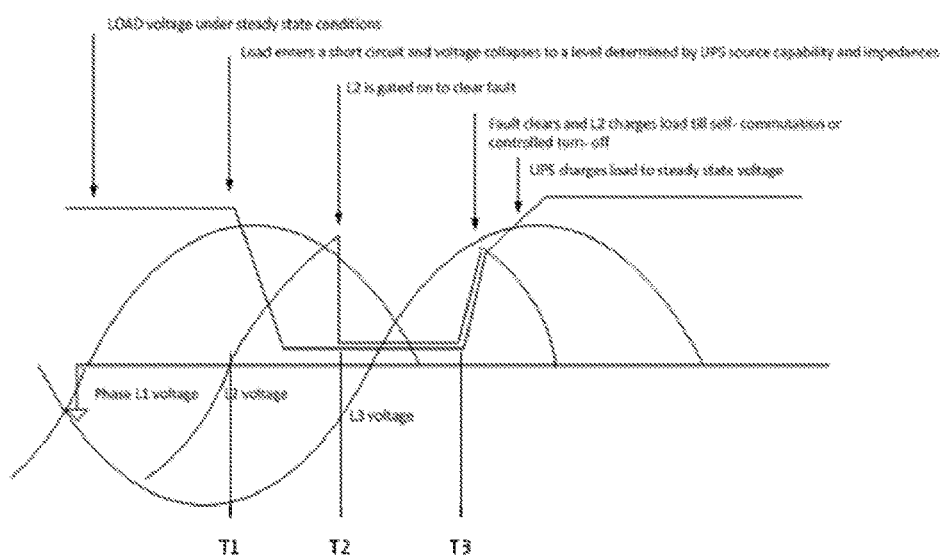
FIG. 4 shows a timing diagram illustrating the function of the UPS system and the bypass device according to the third embodiment in case of a fault.
Figure 5:
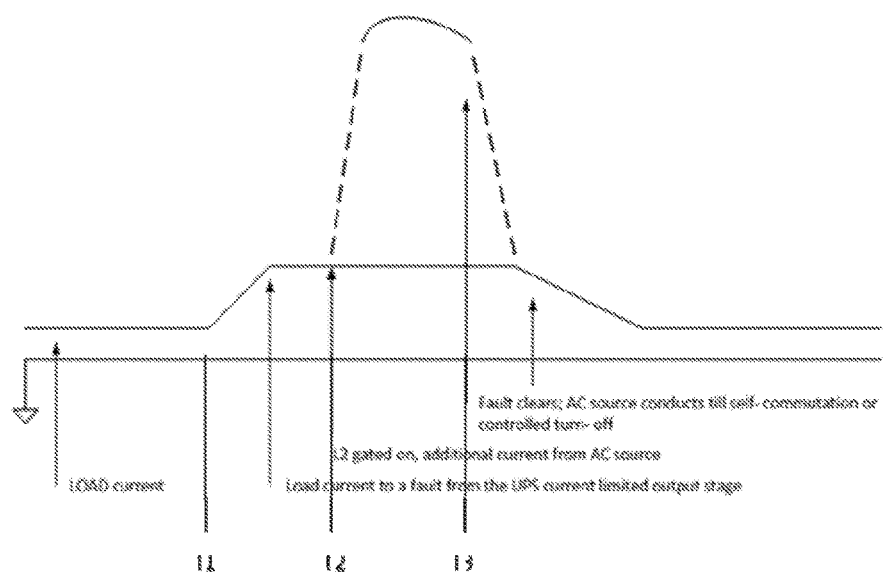
FIG. 5 shows a timing diagram illustrating the out current of the UPS system and the bypass device according to the third embodiment in case of a fault.

In step S120, the bypass device 142 is activated. Hence, the switching unit 144 is switched on by the control unit 138 via the gating circuit 146 to supply pulsed power from the first AC power supply 108 with the same polarity as the DC output line 116 for passing power to the load 118. As can be seen in FIG. 4, the three phases L1, L2, L3 of the AC-power supply line 112 alternate from positive to negative voltage polarity and back. In the example shown in FIG. 5, at time T2, L2 is connected via bypass device 142 to the DC output line 116 to increase the current and to enable fault clearance. The run of the current with the increase at T2 is shown in FIG. 5. Hence, with the additional current provided from L2 of the first AC source 108, protection means of the load 118 can be activated, which can be seen at T3. In case the polarity of the voltage of L2 turns to negative, L2 can be gated again until the protection means of the load 118 are activated. Hence, multiple power pulses are provided from L2 in this case, whereby power from L2 of the first AC source 108 is only provided to the DC output line 116 when the polarity of L2 and the DC output line 116 are the same.

As can be further seen in FIG. 4, the control unit 138 is adapted to perform a control of the switching unit 144 based on a phase angle of the first AC source 108. Hence, only part of the half wave of L2 having the polarity of the DC output line 116 is provided from the bypass device 142 to the load 118.

In step S130, the bypass device 142 is de-activated. The fault is cleared at the load 118 and the converter 102 returns to normal operation to provide DC power to the DC output line 116.

Figure 6:
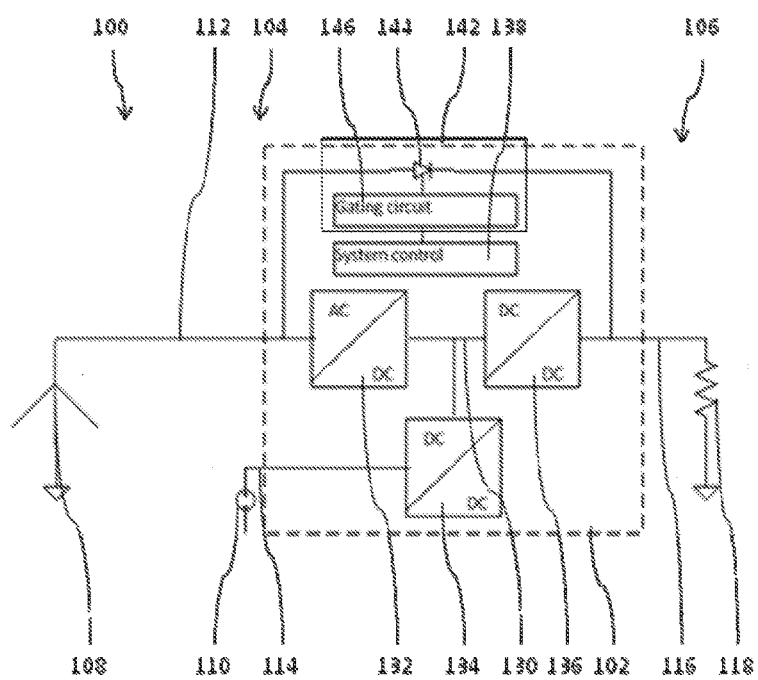
FIG. 6 shows an UPS system in accordance with the UPS system shown in FIG. 2, where the converter is provided integrally with the bypass device according to a third embodiment as a schematic drawing.

A UPS system 100 according to a third embodiment is shown in FIG. 6. The UPS system 100 of the third embodiment is in-line with the UPS system 100 of the second embodiment, as described with respect to FIG. 2. Features not explicitly described with respect to the third embodiment are identical to those of the second embodiment.

In the UPS system 100 of the third embodiment, the bypass device 142 is provided as integral part of the converter 102. The bypass device 142 comprises a switching unit 144, which is a semiconductor switch in this embodiment, in particular a thyristor, and a gating circuit 146, which together provide a rectifier. The behavior of the UPS system 100 of the third embodiment is identical to the behavior of the UPS system 100 of the second embodiment, as described above in detail.

Figure 7:
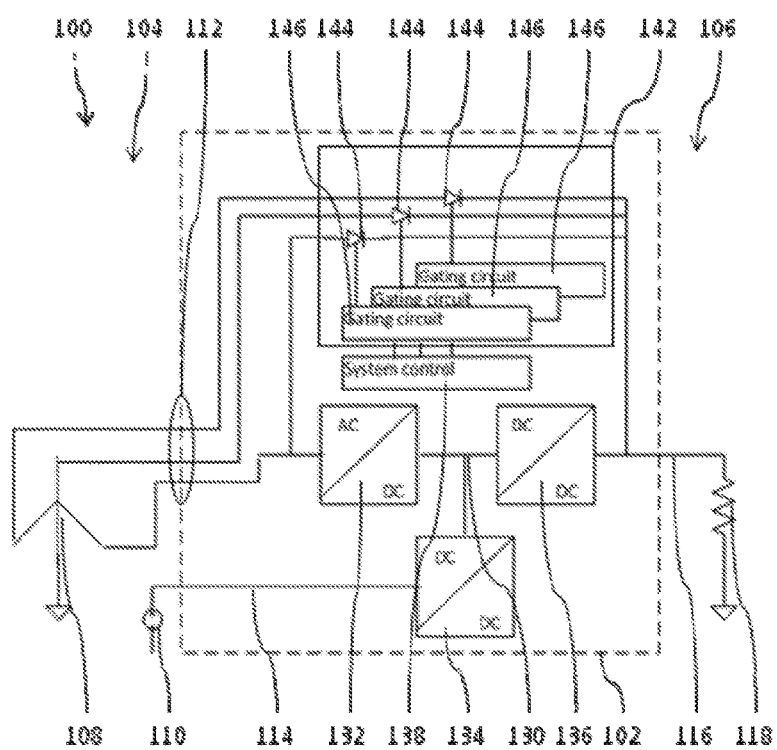
FIG. 7 shows an UPS system in accordance with the UPS system shown in FIG. 3, where the bypass device is provided as a three phase bypass device according to a fourth embodiment as a schematic drawing.

A UPS system 100 according to a fourth embodiment is shown in FIG. 7. The UPS system 100 of the fourth embodiment is in-line with the UPS system 100 of the second or third embodiment, as described above. Features not explicitly described with respect to the fourth embodiment are identical to those of the second or third embodiment.

Figure 8:
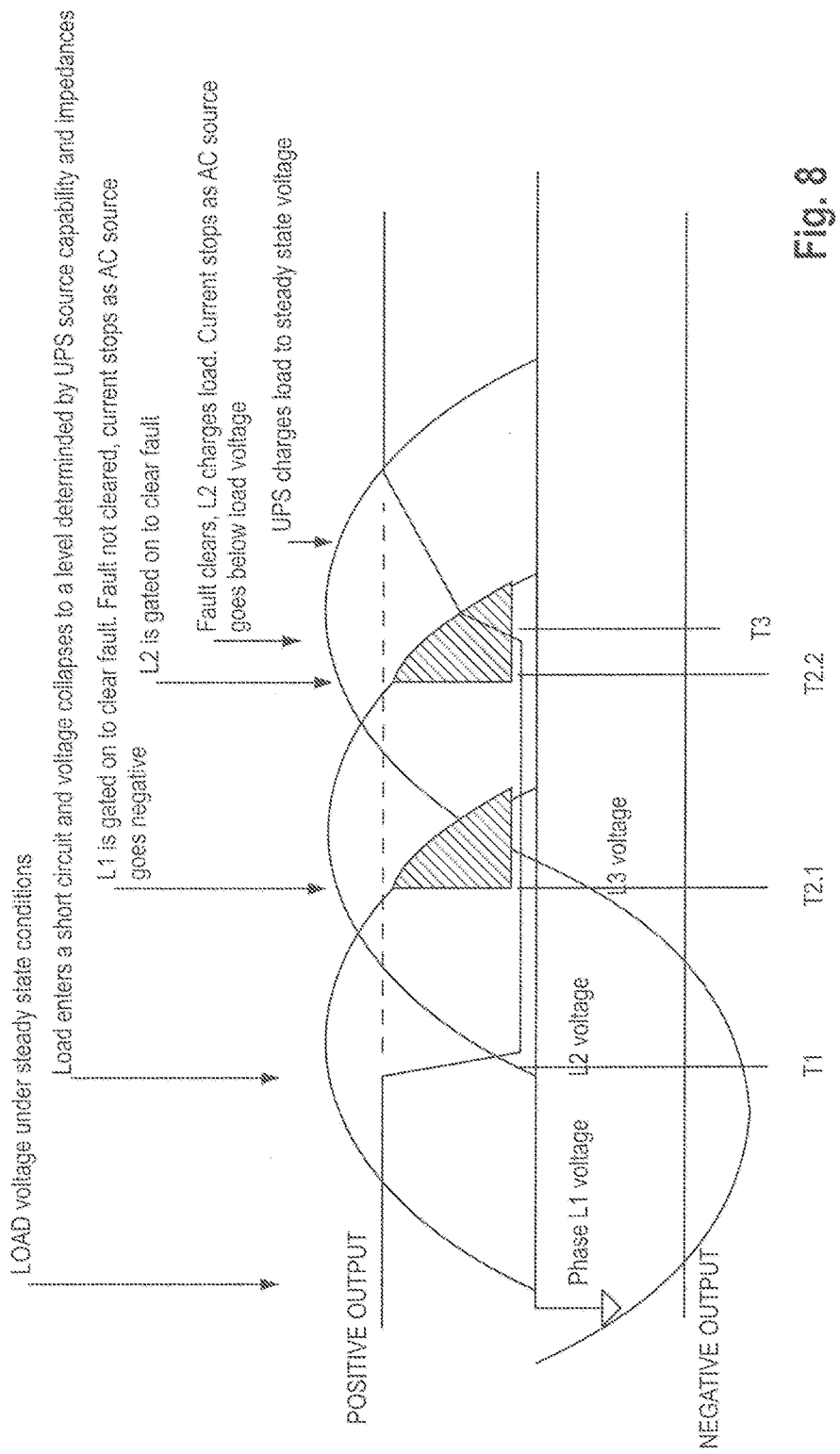
FIG. 8 shows a timing diagram illustrating the function of the UPS system and the bypass device according to the fourth embodiment in case of a fault.

In the UPS system 100 of the fourth embodiment, the bypass device 142 is provided as integral part of the converter 102. The bypass device 142 comprises three switching units 144 and three gating circuits 146, which are connected to the three phases L1, L2, L3 of the first AC power source 108. Accordingly, power pulses from the three phases L1, L2, L3 can provide power to the DC output line 116 in case of failure, e.g. in case of a short circuit. This function can be seen in FIGS. 8 and 9. For reasons of simplicity, only positive half wave of L1 and L2 is shown in FIG. 8.

Figure 9:
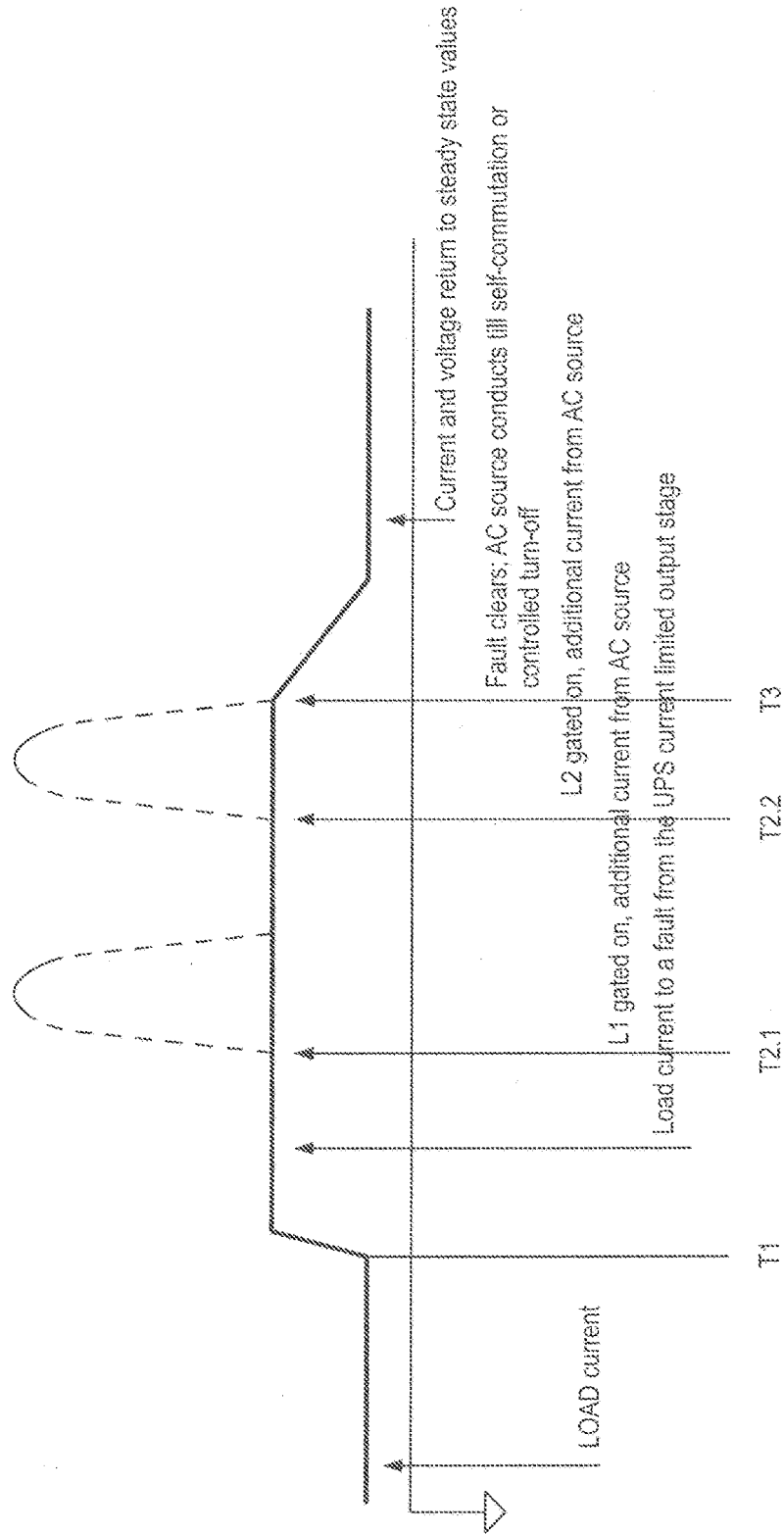
FIG. 9 shows a timing diagram illustrating the out current of the UPS system and the bypass device according to the fourth embodiment in case of a fault.

The general behavior of the bypass device 142 is as described above with respect to the second embodiment. The difference is that all phases L1, L2, L3 can support the load 118 via the DC output line 116. Accordingly, after the fault occurs at T1, at time T2.1, L1 is connected via bypass device 142 to the DC output line 116 to increase the current and to enable fault clearance. The run of the current with the increase at T2.1 is shown in FIG. 9. When the polarity of L1 turns negative, the switching unit 144 of L1 disconnects L1. At time T2.2, L2 is connected via bypass device 142 to the DC output line 116 as described above with respect to L1. Hence, with the additional current provided from L1 and L2 of the first AC source 108, protection means of the load 118 can be activated, which can be seen at T3. Hence, multiple power pulses are provided from L1 and L2 in this case in accordance with the polarity of L1 and L2, respectively, and the DC output line 116.

Figure 10:
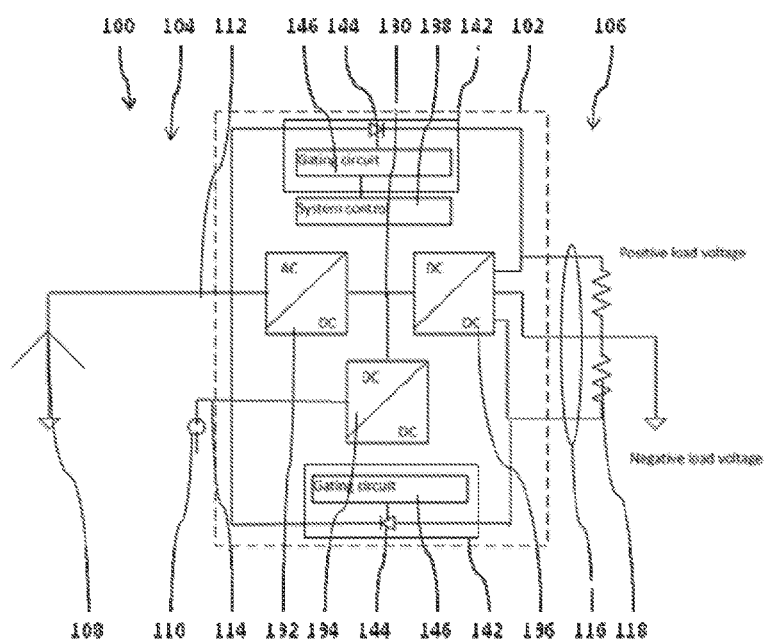
FIG. 10 shows an UPS system in accordance with the UPS system shown in FIG. 3, where the converter provides positive and negative voltage to the load and the bypass device is provided as a bypass device for positive and negative polarity according to a fifth embodiment as a schematic drawing.

A UPS system 100 according to a fifth embodiment is shown in FIG. 10. The UPS system 100 of the fifth embodiment is in-line with the UPS system 100 of the previous embodiments described above. Features not explicitly described with respect to the fifth embodiment are identical to those of the previous embodiments.

In the UPS system 100 of the fifth embodiment, the DC output line 116 comprises three poles including a positive pole, a negative pole, and a an electric middle pole, whereby the electric middle pole is connected to the neutral reference of the four-wire AC-power supply line 112.

In the UPS system 100 of the fifth embodiment, the bypass device 142 is provided as integral part of the converter 102. The bypass device 142 comprises two switching units 144 and two gating circuits 146. The two switching units 144 are connected to the positive and negative pole of the DC output line 116 for supplying pulsed power with essentially the same polarity as the DC output line 116 to the load 118 at the positive and negative pole with reference to the electric middle pole. On the power supply side 104, the two switching units 144 can be connected to the same phase L1, L2, L2, or to different phases L1, L2, L2. Furthermore, in a modified fifth embodiment, multiple switching units 144 and gating circuits 146 can be provided accordance with the fourth embodiment for connecting each pole of the DC output line 116 to multiple phases L1, L2, L3 subsequently.

It is to be noted that the bypass device 142, although depicted as two individual devices can be implemented commonly as a single device. The general behavior of the bypass device 142 of the fifth embodiment is as described above with respect to the second or third embodiment.

Figure 11:
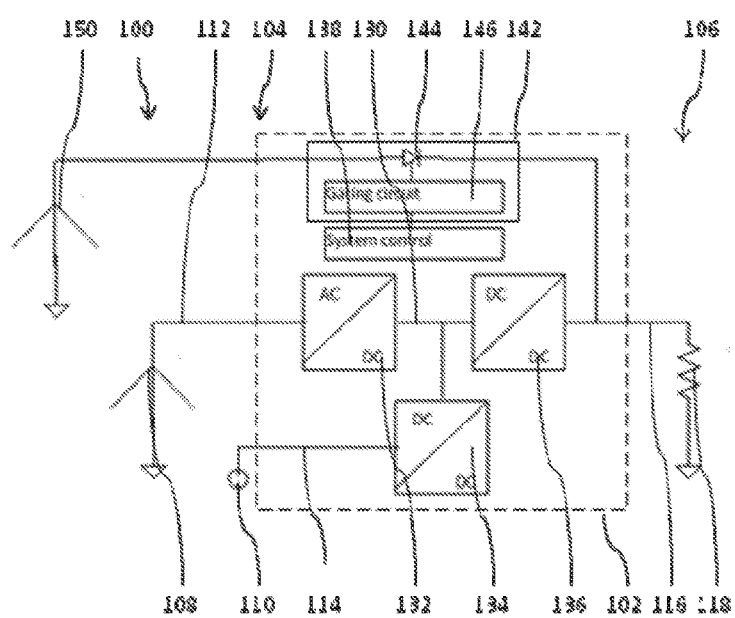
FIG. 11 shows an UPS system in accordance with the UPS system shown in FIG. 3, comprising a first and a second AC source according to an sixth embodiment as a schematic drawing.

A UPS system 100 according to a sixth embodiment is shown in FIG. 11. The UPS system 100 of the sixth embodiment is in-line with the UPS system 100 of the previous embodiments described above. Features not explicitly described with respect to the sixth embodiment are identical to those of the previous embodiments.

The UPS system 100 of the sixth embodiment comprises a second AC source 150, which is connected to the bypass device 142, and the bypass device 142 is controlled by the control unit 138 to supply pulsed power from the second AC source 150. Apart from this, the general behavior of the bypass device 142 of the sixth embodiment is as described above with respect to the second or third embodiment.

A UPS system 100 according to a seventh embodiment is shown in FIG. 12. The UPS system 100 of the seventh embodiment is in-line with the UPS system 100 of the previous embodiments described above. Features not explicitly described with respect to the seventh embodiment are identical to those of the previous embodiments.

The UPS system 100 of the seventh embodiment comprises a discharge switch unit 152, which is connected between one pole of the DC output line 116, which is not connected to the neutral reference of the of the four-wire AC-power supply line 112, and a current sink 154. The current sink 154 is neutral reference of the of the four-wire AC-power supply line 112 in this embodiment. Furthermore, the control unit 138 is adapted to control the discharge switch unit 152 to connect the pole to the current sink 154 after the switching unit 144 is switched on, i.e. after the switching unit 144 of the bypass device 142 de-activates the bypass. In particular, the discharge switch unit 152 can be switch to connect the pole to the current sink 154 almost simultaneously when switching of the bypass devices 142 is performed, or after switching the switching of the bypass devices 142.

The discharge switch unit 152 comprises a discharge switch element 156 and a discharge gating circuit 158 similar to the bypass device 142. The discharge switch unit 152 enables uni-directional conduction between the pole and the current sink 154 to clamp overvoltages due to bypass currents when a load side fault is cleared.

Apart from this, the general behavior of the bypass device 142 of the seventh embodiment is as described above with respect to the second or third embodiment.

Figure 13:
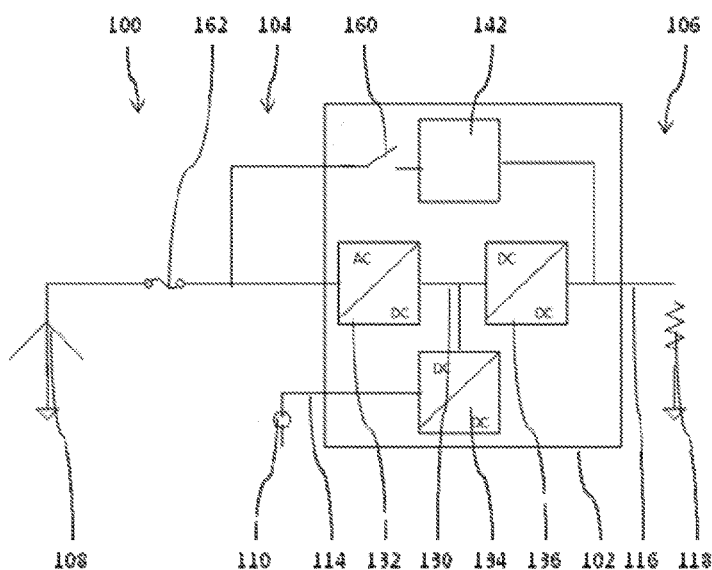
FIG. 13 shows an UPS system in accordance with the UPS system shown in FIG. 3, comprising additional protection mean according to an eighth embodiment as a schematic drawing.

A UPS system 100 according to an eighth embodiment is shown in FIG. 13. The UPS system 100 of the eighth embodiment is in-line with the UPS system 100 of the previous embodiments described above. Features not explicitly described with respect to the eighth embodiment are identical to those of the previous embodiments.

The UPS system 100 according to the eighth embodiment is based on the UPS system 100 of the third embodiment. In addition, the UPS system 100 of the eighth embodiment comprises a backfeed protection switch 160 and a converter input protection device 162, which is a thermal fuse in this embodiment. The converter input protection device 162 is provided in the AC power supply line 112 prior to branches connecting the first converter unit 132 and the bypass device 142 and protects the converter 102 and the converter 102 entirely.

The general behavior of UPS system 100 and the bypass device 142 of the eighth embodiment is as described above with respect to the second or third embodiment.

Figure 14:
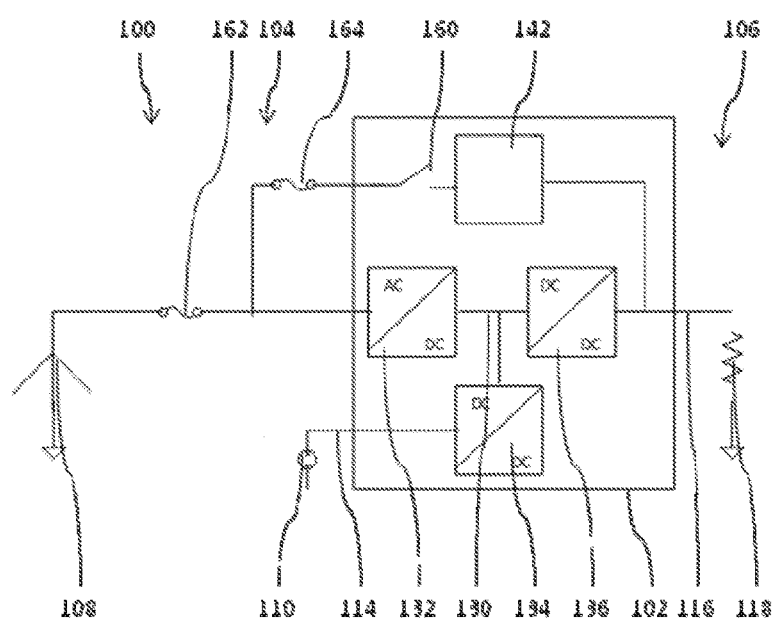
FIG. 14 shows an UPS system in accordance with the UPS system shown in FIG. 3, comprising additional protection mean according to a ninth embodiment as a schematic drawing.

A UPS system 100 according to a ninth embodiment is shown in FIG. 14. The UPS system 100 of the ninth embodiment is in-line with the UPS system 100 of the previous embodiments described above. Features not explicitly described with respect to the ninth embodiment are identical to those of the previous embodiments.

In particular, the UPS system 100 according to a ninth embodiment is identical to the UPS system 100 according to the eighth with an additional bypass input protection device 164, which is a thermal fuse in this embodiment, and which is provided in a branch connecting the converter input protection device 162 and the backfeed protection switch 160.

The general behavior of UPS system 100 and the bypass device 142 of the ninth embodiment is as described above with respect to the second or third embodiment.

Figure 15:
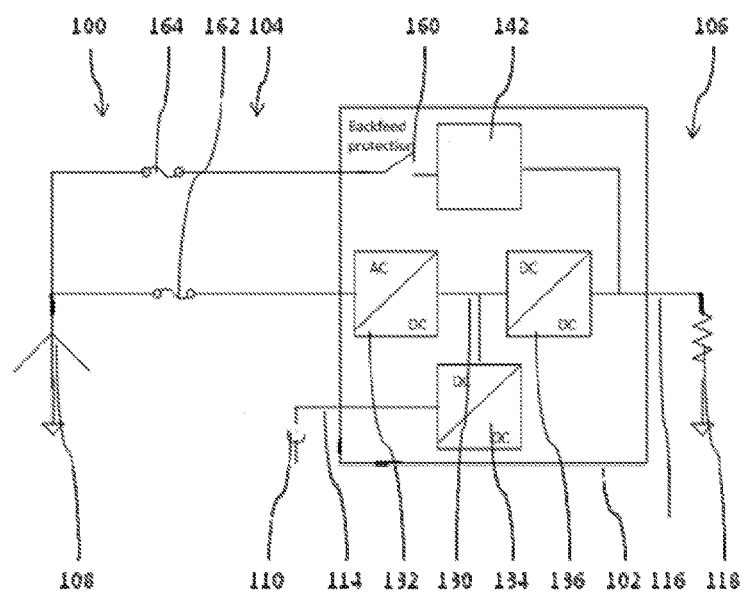
FIG. 15 shows an UPS system in accordance with the UPS system shown in FIG. 3, comprising additional protection mean according to an tenth embodiment as a schematic drawing.

A UPS system 100 according to a tenth embodiment is shown in FIG. 15. The UPS system 100 of the tenth embodiment is in-line with the UPS system 100 of the previous embodiments described above. Features not explicitly described with respect to the tenth embodiment are identical to those of the previous embodiments.

In particular, the UPS system 100 according to a tenth embodiment is identical to the UPS system 100 according to the ninth with the difference, that the bypass input protection device 164 and the converter input protection device 162 are connected in parallel directly to the AC power supply line 112.

The general behavior of UPS system 100 and the bypass device 142 of the tenth embodiment is as described above with respect to the second or third embodiment.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 100 uninterruptable power supply (UPS) system
102 converter
104 power supply side
106 load side
108 first AC source
110 DC source
112 AC-power supply line
114 DC power supply line
116 DC output line
118 load
120 communication bus
122 control device
130 DC link
132 first input converter unit
134 second input converter unit
136 output converter unit
138 control unit
140 additional unit
142 bypass device
144 switching unit, semiconductor switch
146 gating circuit
150 second AC source
152 discharge switch unit
154 current sink
156 discharge switch element
158 discharge gating circuit
160 backfeed protection switch
162 converter input protection device
164 bypass input protection device
L1 phase of AC source
L2 phase of AC source
L3 phase of AC source

The invention claimed is:

1. Uninterruptable power supply system comprising:
a first AC source providing three-phase AC power via a four-wire AC-power supply line;
a DC source providing DC power via a DC power supply line, and
a power converter receiving AC power from the first AC source and/or DC power from the DC source and delivering two wire DC power to a load via a DC output line,
whereby one pole of the DC output line is connected to the neutral reference of the four-wire AC-power supply line,
the uninterruptable power supply system further comprises a bypass device for passing power from its output side to the DC output line, whereby
the bypass device and the power converter are connected in parallel to the DC output line, and
the bypass device comprises at least one switching unit, which receives AC power at its input side, and a control unit, whereby the switching unit is controlled by the control unit to supply pulsed power from an AC power supply with essentially the same polarity as the DC output line.

2. Uninterruptable power supply system according to claim 1, wherein the DC output line comprises three poles including a positive pole, a negative pole, and a an electric middle pole, whereby the electric middle pole is connected to the neutral reference of the four-wire AC power supply line.

3. Uninterruptable power supply system according to claim 2, wherein the bypass device comprises at least two switching units, which are connected to the positive and negative pole, for supplying pulsed power with essentially the same polarity as the DC output line to the load at the positive and negative pole with reference to the electric middle pole.

4. Uninterruptable power supply system according to claim 3, wherein the bypass device comprises at least two switching units for supplying, pulsed power with essentially the same polarity as the DC output line to the load, whereby the switching units are at their input side connected to different phases of the first AC source which are connected at their output side to the same pole of the DC output line.

5. Uninterruptable power supply system according to claim 4, wherein the switching units comprise a silicon controlled half wave rectifier circuit or at least one IGBT.

6. Uninterruptable power supply system according to claim 5, wherein the uninterruptable power supply system further comprises a second AC source, which is connected to the bypass device, and the bypass device is controlled by the control unit to supply pulsed power from the second AC source.

7. Uninterruptable power supply system according to claim 6, wherein the control unit is adapted to perform a control of the at least one switching unit based on a phase angle of the AC source.

8. Uninterruptable power supply system according to claim 7, wherein the uninterruptable power supply system comprises multiple converters, which are connected in parallel between the first AC source and the DC source on the one side and the DC output line on the other side.

9. Uninterruptable power supply system according to claim 8, wherein the uninterruptable power supply system comprises a bypass input protection device connected at a power supply side of the bypass device, and the uninterruptable power supply system comprises a converter input protection device connected between the first AC source and the converter.

10. Uninterruptable power supply system according to claim 9, wherein the bypass input protection device is provided to activate its protection with less energy than the converter input protection device, and the bypass device comprises a discharge switch unit, which is connected between one pole of the DC output line, which is not connected to the neutral reference of the of the four-wire AC-power supply line, and a current sink, and the control unit is adapted to connect the pole to the current sink after the switching unit is switched on.

11. Uninterruptable power supply system according to claim 2, wherein the switching units comprise a silicon controlled half wave rectifier circuit or at least one IGBT.

12. Uninterruptable power supply system according to claim 1, wherein the bypass device comprises at least two switching units for supplying pulsed power with essentially the same polarity as the DC output line to the load, whereby the switching units are at their input side connected to different phases of the first AC source which are connected at their output side to the same pole of the DC output line.

13. Uninterruptable power supply system according to claim 1, wherein the uninterruptable power supply system further comprises a second AC source, which is connected to the bypass device, and the bypass device is controlled by the control unit to supply pulsed power from the second AC source.

14. Uninterruptable power supply system according to claim 1, wherein the control unit is adapted to perform a control of the at least one switching unit based on a phase angle of the AC source.

15. Uninterruptable power supply system according to claim 1, wherein the uninterruptable power supply system comprises multiple converters, which are connected in parallel between the first AC source and the DC source on the one side and the DC output line on the other side.

16. Uninterruptable power supply system according to claim 1, wherein the uninterruptable power supply system comprises a bypass input protection device connected at a power supply side of the bypass device.

17. Uninterruptable power supply system according to claim 16, wherein the bypass input protection device is provided to activate its protection with less energy than the converter input protection device.

18. Uninterruptable power supply system according to claim 1, wherein the uninterruptable power supply system comprises a converter input protection device connected between the first AC source and the converter.

19. Uninterruptable power supply system according to claim 1, wherein the bypass device comprises a discharge switch unit, which is connected between one pole of the DC output line, which is not connected to the neutral reference of the of the four-wire AC-power supply line, and a current sink, and the control unit is adapted to connect the pole to the current sink after the switching unit is switched on.

20. Method for realizing a bypass in an uninterruptable power supply system comprising a first AC source providing three-phase AC power via a four-wire AC-power supply line, a DC source providing DC power via a DC power supply line, and a power converter receiving AC power from the first AC source and/or DC power from the DC source and delivering DC power to a load via a DC output line, whereby one pole of the DC output line is connected to the neutral reference of the four-wire AC-power supply line, comprising the steps of:

providing a bypass device, connecting the bypass device and the power converter in parallel to the DC output line, whereby the bypass device comprises at least one switching unit, detecting a load failure, controlling the switching unit to supply pulsed power from an AC power supply received from its input side with essentially the same polarity as the DC output line for passing power from its output side to the DC output line.

\* \* \* \* \*